（12) United States Patent
Dalmayrac

(10) Patent No.: US 10,180,569 B2
(45) Date of Patent: Jan. 15, 2019

(54) DISPLAY FOR DISPLAYING A VIRTUAL IMAGE IN THE FIELD OF VISION OF A DRIVER, AND DEVICE FOR GENERATING IMAGES FOR SAID DISPLAY

(71) Applicant: Valeo Études Électroniques, Créteil (FR)

(72) Inventor: Stéphane Dalmayrac, Cretail (FR)

(73) Assignee: Valeo Etudes Electroniques, Creteil (FR)

( * ) Notice: Subject to any disclaimer, the term of this patent is extended or adjusted under 35 U.S.C. 154(b) by 0 days.

(21) Appl. No.: 14/652,860

(22) PCT Filed: Dec. 18, 2013

(86) PCT No.: PCT/FR2013/000348
§ 371 (c)(1),
(2) Date: Jun. 17, 2015

(87) PCT Pub. No.: WO2014/096569
PCT Pub. Date: Jun. 24, 2014

(65) Prior Publication Data
US 2015/0331235 A1   Nov. 19, 2015

(30) Foreign Application Priority Data
Dec. 18, 2012 (FR) ..................... 12 03459

(51) Int. Cl.
*G09G 5/02* (2006.01)
*G02B 27/01* (2006.01)
(Continued)

(52) U.S. Cl.
CPC ............... *G02B 27/01* (2013.01); *B60R 1/00* (2013.01); *B60R 2300/20* (2013.01); *G02B 5/02* (2013.01); *G02B 2027/0118* (2013.01)

(58) Field of Classification Search
CPC .. G02B 27/01; G02B 5/02; G02B 2027/0118; B60R 1/00; B60R 2300/20
See application file for complete search history.

(56) References Cited

U.S. PATENT DOCUMENTS 5,699,056 A * 12/1997 Yoshida ................. G01C 21/26
340/905
2011/0007399 A1 * 1/2011 Dominici ........... G02B 27/0101
359/631
(Continued)

FOREIGN PATENT DOCUMENTS

EP       0 992 969 A1    4/2000
JP       2012-047934 A   3/2012

OTHER PUBLICATIONS

International Search Report issued in PCT/FR2013/000348 dated Feb. 19, 2014 (3 pages).

*Primary Examiner* — Patrick Edouard
*Assistant Examiner* — Joseph Fox
(74) *Attorney, Agent, or Firm* — Osha Liang LLP

(57) ABSTRACT

A display device for displaying a virtual image within the visual field of a driver, said display device including an image generation device, and at least one light sensor, said image generation device being configured for producing with said light sensor a measurement of the ambient light intensity within an area, referred to as ambient background, located in the direction where said image is formed in order to allow the brightness of said image to be adapted to said ambient background. An image generation device for such a display device, said device comprising said sensor are also disclosed.

11 Claims, 1 Drawing Sheet

(51) Int. Cl.
  *B60R 1/00* (2006.01)
  *G02B 5/02* (2006.01)

(56) References Cited

U.S. PATENT DOCUMENTS

| | | | |
|---|---|---|---|
| 2012/0001833 A1 | 1/2012 | Lindig et al. | |
| 2012/0075534 A1* | 3/2012 | Katz | H04N 9/3182 348/602 |
| 2012/0218125 A1* | 8/2012 | Demirdjian | G08G 1/164 340/905 |
| 2012/0274745 A1* | 11/2012 | Russell | H04N 13/025 348/46 |
| 2013/0135748 A1 | 5/2013 | Sato et al. | |
| 2014/0078378 A1* | 3/2014 | Demers | G01S 17/89 348/359 |
| 2015/0332654 A1* | 11/2015 | Geloen | G02B 27/01 345/697 |

\* cited by examiner

DISPLAY FOR DISPLAYING A VIRTUAL IMAGE IN THE FIELD OF VISION OF A DRIVER, AND DEVICE FOR GENERATING IMAGES FOR SAID DISPLAY

The invention relates to a display device for displaying a virtual image within the visual field of a driver and an image generation device for said display device.

Devices are known emitting a light beam designed to form an image for informing the users of a vehicle, notably its driver.

In particular, equipping an automobile vehicle with a display device, referred to as head-up display, is known. Such a device displays within the visual field of the automobile driver information relating to the state of the automobile vehicle, of the traffic or other information.

This display device generally comprises an image generation device, optical components specific to the architecture of the device and electronics for management of the device connected to the vehicle equipped with it. The image generation device takes the form of a housing in which the components of the device are assembled. The brightness of the image displayed must be adapted, notably in light intensity, to the ambient light intensity so as to offer a sufficient contrast with the road but without dazzling the driver, in particular in the dark.

It is possible to use, for this purpose, light intensity sensors of the vehicle for the automatic activation of the headlights. However, since the information from the sensors has to transit via a network of the vehicle loses in reactivity and is not optimal for adapting the brightness of the displayed image in real time to the ambient light intensity.

Furthermore, the light intensity measured by said sensors is not totally relevant in view of the area targeted by the sensors.

It is furthermore possible to place light intensity sensors on a top part of the dashboard of the vehicle for measuring the ambient light intensity in an ambient background of the displayed image, in other words the brightness of the scene appearing to the driver when he/she looks in the direction of said image. Such sensors are prominent and they moreover require an external cabling, which is not very esthetic and not without cost.

The aim of the invention is to overcome all or part of these drawbacks.

According to the invention, a display device is provided for displaying a virtual image within the visual field of a driver, said display device comprising:
  an image generation device and,
  at least one light sensor,
said image generation device being configured for producing with said light sensor a measurement of the ambient light intensity within an area, referred to as ambient background, located in the direction where said image is formed in order to allow the brightness of said image to be adapted to said ambient background.

Thus, the display device according to the invention allows a comfortable image to be offered to the driver of the vehicle, for example which is clearly distinguished and whose light intensity is sufficient and non-dazzling, by a measurement of the brightness in a relevant area, namely in the direction of said image. The handling of the information coming from the sensor by the images generation device furthermore allows the speed of reaction of the display device to be enhanced.

According to various embodiments of the invention, which could be taken together or separately:

said light sensor is integrated into said image generation device in such a manner as to receive a light beam in the reverse direction to that of the emission of said image and corresponding to the ambient light present in the ambient background of said image, said light sensor is positioned in an optical path of the light beam for emission of said image, said display device comprises optical components for displaying said image within the visual field of the driver, said optical components defining all or part of said optical path, said light sensor is positioned relative to one of the optical components in such a manner as to receive from said optical component a light beam in the reverse direction to that of the emission of said image and corresponding to the ambient light present within said image, said image generation device comprises a housing, the housing transmitting said image via one of said optical components situated on one face of the housing, said sensor is situated inside of said housing, said light sensor is disposed close to said optical component situated on one face of the housing, said light sensor is rigidly attached to said optical component situated on one face of the housing and/or of said housing, said optical component situated on one face of said housing is an image diffuser, said image generation device comprises a control unit for producing said image, said light sensor is connected to said control unit, said control unit being designed to adjust the brightness of said image relative to said ambient background, in correspondence with the ambient light measured by the light sensor, said device for generating image comprises a light source, said light source comprises one or more laser diodes.

The invention furthermore relates to an image generation device for a display device such as described hereinabove, said sensor being provided within said image generation device.

Said device is advantageously configured so as to be adapted to various display devices, according to a standardized fabrication of the image generation device.

These features and advantages of the invention and others will become more clearly apparent in view of the description hereinafter of embodiments of the invention with reference to the appended drawings, in which.

In the description that follows, identical references are used to designate similar or identical elements.

Figure 1:
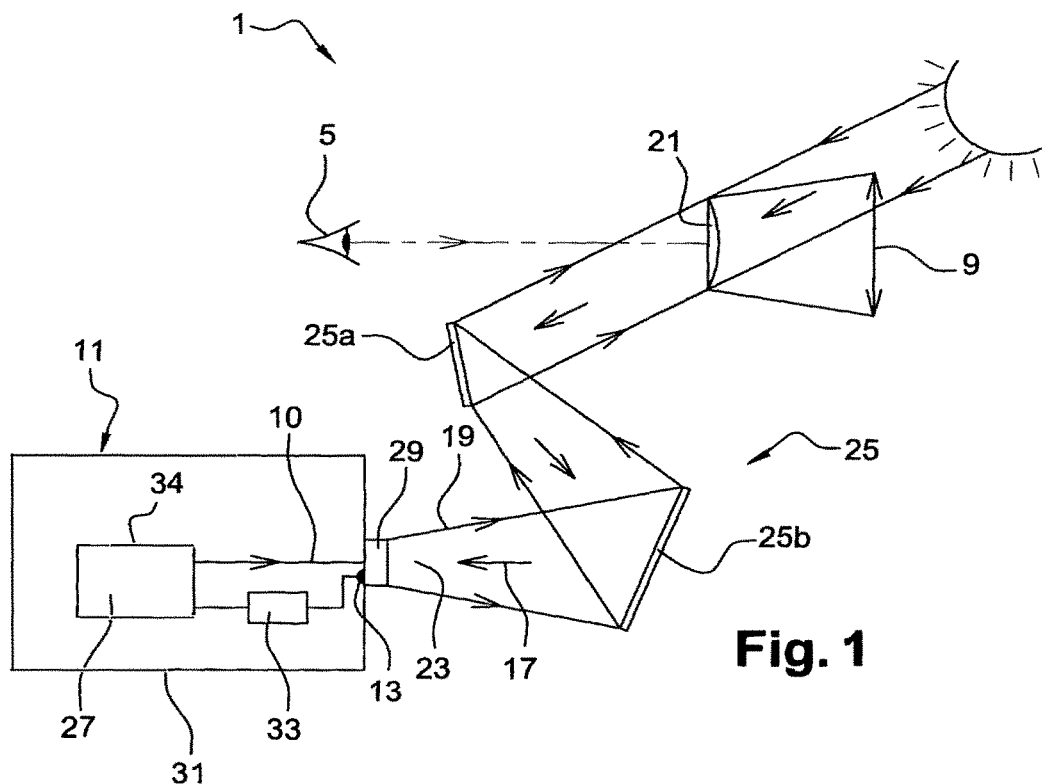
FIG. 1 is a schematic view in elevation of an image display device of for a vehicle according to the invention.

As illustrated in FIG. 1, the invention relates to a display device 1, otherwise referred to head-up display device, for displaying a virtual image 9 within the visual field 3 of a driver 5 of a vehicle observing a driving path 7 (FIG. 2) of the automobile vehicle.

The display device 1 comprises an image generation device 11. Said device comprises, for example, a scanning projector 34 equipped with one or more light sources each emitting a beam of the laser type. These are, for example, laser sources, typically laser diodes, each laser source emitting a monochromatic beam, in other words consisting of a single color.

Said device could typically comprise three sources, said device being configured for forming a light beam by means of a common path by combination of the beams individually emitted by each of said sources. More precisely, the sources could emit a beam of a different color from one source to another. The colors are, for example, red, green and blue (RGB).

The optical power of each of the sources is independently controlled by means of the power supply current for the laser source or sources. At a given optical power, the color of the light beam is determined by the way in which a power ratio is established between the various laser diodes. For example, in order to obtain white light, the optical powers, as a proportion, must be established according to the following distribution: 60 for the green diode, 30 for the blue diode, 10 for the red diode. The optical power of each of the sources could also be controlled in order to modulate the optical power of the light beam.

The beams emitted by each of the sources are oriented, for example, parallel to one another and reflected in the same direction so as to form, by combination, the light common beam. For this purpose, said device comprises optical elements that are semi-transparent over a range of wavelengths, such as dichroic mirrors or combiner plates, intercepting the beams emitted by each of said sources and combining them in the direction of said beam.

More generally, said device is configured for forming said light beam from said laser beam or beams, irrespective of the number of sources involved. In the case of a single source, the light beam is composed of the laser beam emitted by the single source employed and the image obtained will then be monochrome, composed of the various levels of optical powers applied at each of the points composing it, according to a grading of said color. In the case of a plurality of sources, typically the three sources mentioned hereinabove, said common beam which then forms said light beam will allow an image to be established according to a color spectrum whose resolution will correspond the resolution of the control of the power supply for said sources.

Said device could furthermore comprise means for controlling the current supply to said sources. As mentioned hereinabove, they could allow a choice of the color of the light beam.

Said scanning projector furthermore comprises, for example, a scanning projector whose function is to move horizontally and vertically the light beam emitted by light source or sources with a view to carrying out a scanning according to a frequency, notably equal to 60 Hz, by way of non-limiting example. The scanning projector notably comprises a scanning mirror using a micro-electro-mechanical system (hereinafter called MEMS mirror) on which the light beam emitted by the light source or sources is reflected as a scanning beam 10. Such a MEMS mirror has for example a diameter of 1 mm². The MEMS mirror is designed to rotate about two axes of rotation for in order to carry out a scanning, for example at the refresh frequency of 60 Hz, of a diffuser screen 29 of said device. Said image is then formed on said diffuser 29. Alternatively, the MEMS mirror may be replaced by two plane and movable mirrors, whose movements are linked. One of these mirrors can be dedicated to a scanning along a horizontal axis, whereas the other mirror can be dedicated to a scanning along a vertical axis.

The diffuser 29 where the image is formed could be a transparent projection screen with a complex structure for a projection by transparency. It could alternatively be translucent. It is made, for example, of glass, notably unpolished, or made of polycarbonate. By way of example, the diffuser screen 29 is of the "Exit Pupil Expander" type. It allows the cone of observation to be made wider. It extends in a plane traversed by the light beam, the image resulting from this scanning beam 10 being formed in the plane of one face of the diffuser screen 29.

This diffuser screen receives the scanning beam 10. It is arranged so as to cause a dispersion of this scanning beam 10 along an angular sector, for example equal to 30° with respect to the direction of the scanning beam 10 at the point where it is incident on the diffuser screen 29. For this purpose, according to one non-limiting example, one face of the diffuser screen is roughened, in the sense that it comprises irregularities which cause the dispersion of the scanning beam. The roughened face corresponds to that via which the beam exits, in other words the face on which the image is formed.

Downstream of the diffuser screen 29 relative to the direction of travel of the light beam, said display device comprises at least one semi-reflecting plate 21 and, optionally, a reflection device 25 interposed in the path of the image between the diffuser screen 29 and the semi-reflecting plate 21. In this figure, the path of the image is symbolized by arrows which are reflected on the reflection device 25 prior to being displayed through the semi-reflecting plate 21. The latter allows a magnification and/or, by transparency, a display of the image 9 beyond said semi-reflecting plate, notably beyond the windshield of the vehicle equipped with the device, on a virtual screen obtained by means of said semi-reflecting plate 21.

This transparent plate exhibits a reflection power equal to at least 20%, which allows the user to see the road along which the vehicle is driving through the plate, while at the same time benefitting from a high contrast allowing the displayed image to be seen. Alternatively, the display of the image may be achieved by means of the windshield of the vehicle equipped with said display device.

Figure 2:
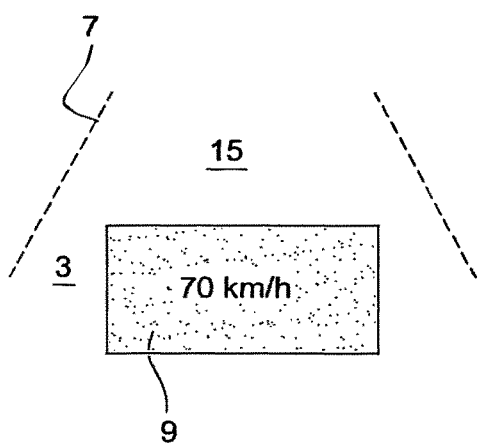
FIG. 2 is a view of one example of an image produced by the display device in FIG. 1, as it is seen by the driver of the vehicle.

However, according to the invention, said display device furthermore comprises at least one light sensor 13. Said image generation device 11 is configured for producing with said light sensor 13 a measurement of the ambient light intensity within an area 15, referred to as ambient background, in the visual field 3 of the driver, where said image is formed in order to allow the brightness of said image to be adapted to said ambient background. In other words, as illustrated in FIG. 2, the ambient background 15 surrounds said image 9.

The measurement of the brightness is thus carried out within an area located in the direction of said image 9 and hence in the direction of the road or path 7 along which the vehicle is travelling.

This disposition allows the driver 5 of the vehicle to be presented with a comfortable image in terms of its brightness, in other words whose light intensity is comfortable, in other words sufficient but not dazzling, in particular in the dark.

Said light sensor 13 is integrated here into said image generation device 11 so as to receive a light beam in the reverse direction 17 to that 19 of the emission of said image, namely directed toward the image generation device 11. This light beam in the reverse direction 17 corresponds to the ambient light present within said image, for example within the ambient background, in particular of the ambient light transmitted by said semi-reflecting plate 21 or said windshield allowing said virtual image 9 to be displayed, as illustrated in FIG. 1.

Said light sensor 13 is advantageously positioned, as shown, in an optical path 23 of the light beam for emission of said image, in other words in a light beam of reflection in the reverse direction 17 of said ambient light.

As already seen, said display device 1 could be provided with optical components, such as two reflecting mirrors 25a, 25b of said reflection device 25, for displaying said image 9 within the visual field 3 of the driver 5, said optical components defining all or part of said optical path 23 of the emitted light beam.

Said light sensor 13 is advantageously positioned relative to one of the optical components, here the first reflecting mirror 25b of the reflection device 25 located downstream of the image generation device 11, in such a manner as to receive from said optical component a light beam 17 in the reverse direction to that of the emission 19 of said image and corresponding to the ambient light present in said image.

Thus, said light sensor 13 sees a light beam 17 in the reverse direction to that of the emission of said image 9 and corresponding to the ambient light present in said image, notably on the ambient background 15, in particular the ambient light transmitted by the terminal optical element 21, namely said semi-reflecting plate or the windshield, allowing said virtual image 9 to be displayed.

The image generation device 11 could in particular comprise a housing 27, comprising one of said optical components defining the optical path for formation of said image, designed to be situated on one face 31 of the housing. This could in particular be the image diffuser 29 of the image generation device. Said light sensor 13 is here disposed near to said image diffuser 29, preferably being rigidly attached, as in the example, to said diffuser 29 and/or to the housing 27.

Said image generation device will advantageously comprise a control unit 33 for producing said image 9. Said control unit comprises, for example, said means of controlling the current supplied to the light sources.

Said light sensor 13 will be connected to said control unit 33, said control unit 33 being rendered capable of adjusting the brightness of said image 9 relative to said ambient background 15, in correspondence with the ambient light measured by the light sensor 13.

Thus, said image 9 could be displayed with a minimal interference on the road 7 being observed.

Furthermore, said image generation device 11 thus equipped with the light sensor 13 could advantageously be configured, for example in a compact and rigid format by its housing 27, so as to be adapted to various display devices, according to a standardized and cost-effective fabrication of the image generation device.

The invention thus provides a display device, which allows an image to be offered to the driver of the vehicle whose light intensity is comfortable and continuously adapted to the ambient light intensity, in other words with a brightness that is sufficient but not dazzling for the driver of the vehicle, in particular in the dark.

The invention claimed is:

1. A display device for displaying a virtual image within the visual field of a driver, said display device comprising:
    an image generation device configured to display the virtual image using an optical path in a first direction;
    at least one semi-reflecting plate, located on the optical path;
    at least one fully reflective device, different from the semi-reflecting plate, located on the optical path, between the image generation device and the at least one semi-reflecting plate; and
    at least one light sensor collocated with the image generation device,
    wherein a beginning of the optical path is established together by the image generation device and the collocated at least one light sensor,
    wherein the optical path is non-branching between the beginning of the optical path and an end of the optical path at the at least one semi-reflecting plate,
    said image generation device being configured for producing with said at least one light sensor a measurement of the ambient light intensity within an area, known as ambient background, located in the direction where said image is formed in order to allow the brightness of said image to be adapted to said ambient background,
    wherein the ambient light reaches the light sensor using the optical path in a second direction, opposite to the first direction.

2. The display device as claimed in claim 1, in which said light sensor is integrated into said image generation device so as to receive a light beam in the reverse direction to that of the emission of said image and corresponding to the ambient light present in the ambient background of said image.

3. The display device as claimed in claim 2, in which said light sensor is positioned in an optical path of the light beam for emission of said image.

4. The display device as claimed in claim 1, comprising optical components for displaying said image within the visual field of the driver, said optical components defining all or part of said optical path.

5. The display device as claimed in claim 4, in which said image generation device comprises a housing, the housing transmitting said image via one of said optical components situated on one face of the housing, said light sensor being disposed nearby said optical component.

6. The display device as claimed in claim 5, in which said light sensor is rigidly attached to one selected from a group consisting of: a diffuser, the housing, and a combination of the diffuser and the housing.

7. The display device as claimed in claim 6, in which said optical component situated on one face of said housing is an image diffuser.

8. The display device as claimed in claim 1, in which said image generation device comprises a control unit for producing said image, said light sensor being connected to said control unit, said control unit being designed to adjust the brightness of said image relative to said ambient background, in correspondence with the ambient light measured by the light sensor.

9. The display device as claimed in claim 1, in which said image generation device comprises a light source equipped with at least one laser diode.

10. An image generation device for the display device as claimed in claim 1, said sensor being provided within said image generation device.

11. The device as claimed in claim 10, configured so as to be adapted to various display devices.

* * * * *